No. 817,207. PATENTED APR. 10, 1906.
H. L. WHEELER.
CAMERA SUPPORT.
APPLICATION FILED OCT. 19, 1905.
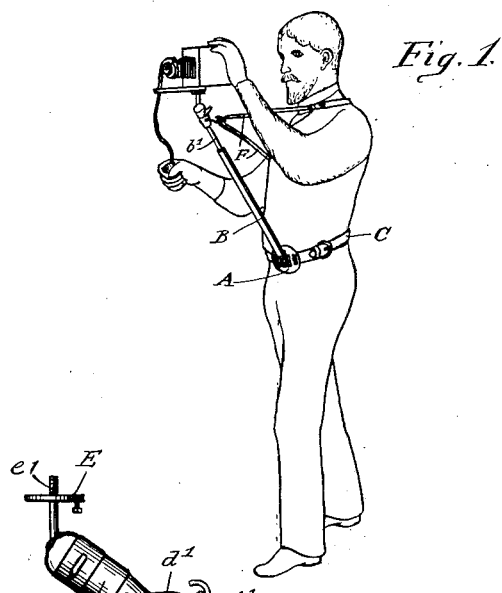
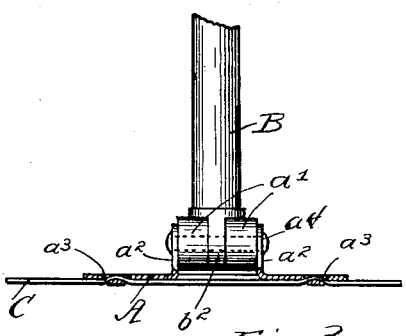
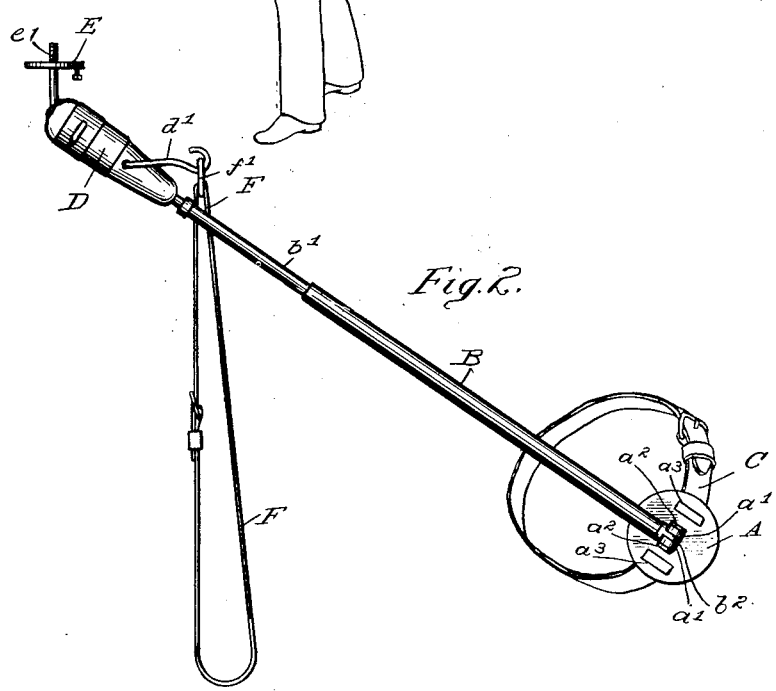
Witnesses:
John Braunwalder
M. A. Milord
Inventor:
Harold L. Wheeler
By Frederick Benjamin
Att'y.

UNITED STATES PATENT OFFICE.

HAROLD L. WHEELER, OF BUFFALO, NEW YORK.

CAMERA-SUPPORT.

No. 817,207.  Specification of Letters Patent.  Patented April 10, 1906.

Application filed October 19, 1905. Serial No. 283,371.

*To all whom it may concern:*

Be it known that I, HAROLD L. WHEELER, a citizen of the United States, residing at Buffalo, in the county of Erie and State of New York, have invented certain new and useful Improvements in Camera-Supports, of which the following is a specification.

My invention relates to improvements in means for supporting cameras, and especially to a device by which portable cameras, such as are in general use by amateur photographers, may be easily adjusted and focused and when in the act of photographing will be held steadily from the body of the photographer without resort to a tripod or similar impedimenta.

One of the objects of the improvements which form the subject-matter of this application is to provide a camera-support which can be easily carried while the user is climbing and which can be quickly brought into position for the operation of the camera supported thereon in places where a tripod could not be set up. It permits the tourist to focus his views accurately without burdening himself with a regular tripod or going through the performance necessary to set one up. For "snap-shot" work it holds the camera in a position level with the eyes, when the object to be photographed may be easily sighted through the view-finder and caught, if necessary, on the fly. It unifies the photographer and his instrument, thus making possible many kinds of work otherwise non-achievable.

Other objects of general utility will be apparent and need not be specifically mentioned.

Referring to the accompanying drawings, which form a part of this application, Figure 1 is a view showing the application or use of my invention. Fig. 2 is a view, on an enlarged scale, of my invention complete. Fig. 3 is an enlarged fragmentary detail showing the hinged connection between two of the parts of my invention.

Referring now to the details of my invention as shown in the drawings, A represents a circular plate, of suitable metal, from the center of which are cut and bent up at right angles lugs $a^2$, and on each side of said lugs loops $a^3$ are formed by cutting and slightly bending portions of the metal. Extending through holes in the lugs is a pin $a^4$, on which are mounted two small rollers which serve as spacers or washers and as antifrictional bearings for the coupling-tip $b^2$ of the tubular rod B, which is pivoted on said pin between said rollers.

C is an ordinary belt supplied with the usual buckle, and same is attached to the plate A by passing it between loops $a^3$ and the adjacent parts of the plate, thus effecting a slidable connection between plate and belt.

In the tubular rod B is telescopically mounted a second tube $b'$, and, if desired, there may be several such tubes having an adjustable or sliding relation to each other. On the outer end of the extensible rod $b'$ is fixed a coupling D, in which is pivotally secured a hook $d'$ and the outer end of which provides a ball-and-socket joint or connection for the tripod-plate E and the camera-screw $e'$, which may be of any of the approved patterns for such devices. Connected detachably with the hook $d'$ by a link $f'$ is a strap F, which is supplied with a buckle and is adapted to serve as a sling in supporting the camera when in operative position, as shown in Fig. 1, or for carrying the camera when not in use, in either case said strap being thrown over one shoulder and under the opposite arm.

In use the belt will be worn by the photographer in the usual manner, and the plate A will be arranged at the side, so that the extensible rod-sections which are pivotally connected with the plate will hang down at the side of the user, so he will have free use of his limbs. The camera-case may be hung on the sling-strap, so as to be carried on the opposite side of the user. When it is desired to use the camera, it will be disconnected from the sling and the latter will be joined to the coupling element D by the hook $d'$. The camera will be connected with the screw $e'$ in the usual manner and tripod-plate adjusted to point the camera correctly. Each user will know after once using at what length he wants the brace.

What I claim is—

1. In a camera-support, a belt adapted to be worn about the waist of the user, a plate slidably mounted on said belt, a brace composed of rods telescopically arranged, and having a pivotal connection with said plate, a coupling comprising a universal joint, secured to said brace, means for attaching a camera to said coupling, an adjustable sling adapted to be worn about the shoulders of the user, and means for loosely connecting said sling with said coupling.

2. In a camera-support, a belt adapted to be worn about the waist of the user, a plate adjustably mounted on said belt, an extensible brace pivoted on said plate, and means for removably connecting a camera with said brace.

3. In a camera-support, in combination with a belt, a plate adjustable on the belt, a brace pivotally connected with said plate, a coupling connected with said brace, and means for removably attaching a camera to said coupling.

In testimony whereof I affix my signature in presence of two witnesses.

HAROLD L. WHEELER.

Witnesses:
GEO. A. ROBINSON,
IDA HORN.